(12) United States Patent
Matsugi

(10) Patent No.: US 7,342,695 B2
(45) Date of Patent: Mar. 11, 2008

(54) INFORMATION MANAGEMENT DEVICE FOR PRINTING APPARATUS AND INFORMATION MANAGEMENT METHOD

(75) Inventor: Hironori Matsugi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 980 days.

(21) Appl. No.: 10/463,845

(22) Filed: Jun. 16, 2003

(65) Prior Publication Data
US 2004/0066532 A1    Apr. 8, 2004

(30) Foreign Application Priority Data
Jun. 17, 2002  (JP)  ............................. 2002-175883
Jun. 12, 2003  (JP)  ............................. 2003-168184

(51) Int. Cl.
H04N 1/46    (2006.01)
H04N 1/62    (2006.01)

(52) U.S. Cl. ...................... 358/531; 358/403; 358/1.15

(58) Field of Classification Search ................ 358/403, 358/1.15, 1.6, 2.1, 531; 345/581
See application file for complete search history.

(56) References Cited

U.S. PATENT DOCUMENTS 5,321,802 A * 6/1994 Furuya et al. .............. 358/403
5,990,901 A * 11/1999 Lawton et al. .............. 345/581
2002/0154335 A1 * 10/2002 Matoba et al. ............. 358/1.15

FOREIGN PATENT DOCUMENTS

JP    2003169203 A  *  6/2003

* cited by examiner

Primary Examiner—King Y. Poon
Assistant Examiner—Lennin R Rodriguez
(74) Attorney, Agent, or Firm—Martine Penilla & Gencarella, LLP

(57) ABSTRACT

An information management device 30 receives an object image to be retouched and printed and a specification of retouching to be performed on the object image as a retouching request from one of multiple printing apparatuses 50a and 50b, and transmits the received retouching request to a computer 60a or 60b of a selected retoucher. The information management device 30 receives a resulting image retouched in response to the transmitted retouching request from the computer 60a or 60b of the selected retoucher and transmits the resulting retouched image to the printing apparatus that has sent the retouching request. The information management device 30 also carries out an accounting process to calculate a charge for the retouching request to each of the multiple printing apparatuses 50a and 50b and a payment process to calculate a payment for retouching of the object image to each of the retouchers, based on reception of the retouching request and transmission of the resulting retouched image.

12 Claims, 15 Drawing Sheets

FIG. 6

RETOUCHING INFORMATION

| Printing Apparatus ID | JA0050a |
|---|---|
| Jurisdiction Management Server ID | CA0040 |
| Image ID | G*****A |
| Reception Date | July 3rd, 2002 |
| Retouching Specification 1 | Dust Removal |
| Retouching Specification 2 | |
| Retouching Specification 3 | |
| Desired Delivery Date | July 10th, 2002 |
| Retoucher ID | |
| Retouched Image ID | |
| Retouched Image Reception Date | |
| Delivery Date | |
| Charge to Printing Apparatus | |
| Amount Payable to Retoucher | |

FIG. 15

EXPENDABLE CONSUMPTION DATA

| Printing Apparatus ID | JA0050a |
|---|---|
| Jurisdiction Management Server ID | CA0040 |
| Data Acquisition Date | Month, Date, Year |
| Printer ID | P*****1 |
| Printer ID | P*****2 |
| Printing Paper Consumption | |
|     Paper (A3/L) by A Corp. | *** |
|     Paper (A4/L) by A Corp. | *** |
|     Paper (A4/M) by B Corp. | *** |
|     Paper (A3/M) by B Corp. | *** |
| Ink Consumption | |
|     Ink (K) by A Corp. | *** |
|     Ink (C) by A Corp. | *** |
|     Ink (M) by A Corp. | *** |
|     Ink (Y) by A Corp. | *** |

INFORMATION MANAGEMENT DEVICE FOR PRINTING APPARATUS AND INFORMATION MANAGEMENT METHOD

BACKGROUND OF THE INVENTION

1. Field of the Invention

The present invention relates to an information management device for printing apparatuses and an information management method. More specifically the invention pertains to an information management device that manages multiple printing apparatuses connecting with the information management device via a communication line, as well as to a corresponding information management method.

2. Description of the Prior Art

Computers with retouching software installed therein for diversely editing images have been proposed as the information management device. The retouching software is used for retouching operations that basically do not give any significant changes to images, such as a retouching operation to reduce red eyes in portraits due to the effects of flash and a retouching operation to reduce wrinkles of the skin in portraits, as well as for significant correction of the tone and the color of images.

The retouching software, however, requires rather complicated operations for retouching and takes a relatively long time for retouching a number of images. Especially a photo studio has difficulties in performing high-performance retouching on a large number of high-quality photographic images.

SUMMARY OF THE INVENTION

The object of the present invention is thus to provide an information management device for printing apparatuses and a corresponding information management method, which efficiently perform high-performance retouching on images to be printed by the multiple printing apparatuses. The object of the invention is also to allow the information management device for printing apparatuses and the information management method to automatically carry out an accounting process and a payment process with regard to retouching of images. The object of the invention is further to allow the information management device for printing apparatuses and the information management method to efficiently and adequately manage the multiple printing apparatuses.

In order to achieve at least a part of the aforementioned objects, the information management device for printing apparatuses and corresponding information management method of the present invention are structured as follows.

A first information management device of the present invention is a device that manages multiple printing apparatuses connecting with the information management device via a communication line, the information management device including: an information storage module that stores information therein; a receiver transmitter module that receives and transmits information via the communication line; a retouching request reception control module that controls the receiver transmitter module to receive retouching request information from one of the multiple printing apparatuses and stores the received retouching request information into the information storage module, where the retouching request information includes printing apparatus identification information for identifying the printing apparatus, image identification information for identifying an object image to be retouched, the object image identified by the image identification information, and retouching specification information regarding a specification of retouching to be performed on the object image; an order information transmission control module that controls the receiver transmitter module to transmit order information to an image retouching device connecting with the information management device via the communication line, where the order information includes at least the object image, the image identification information, and the retouching specification information among the retouching request information stored in the information storage module; a delivery information reception control module that controls the receiver transmitter module to receive delivery information, which includes a resulting image retouched in response to the transmitted order information, and the image identification information included in the order information, from the image retouching device, maps the received delivery information to the retouching request information, which includes the image identification information of the delivery information, and stores the mapped information into the information storage module; and a retouched image transmission control module that controls the receiver transmitter module to transmit at least the resulting retouched image, which is included in the delivery information stored in the information storage module, to the printing apparatus identified by the printing apparatus identification information, which is included in the retouching request information mapped to the delivery information.

The first information management device of the invention receives and stores the retouching request information, which includes the printing apparatus identification information, the image identification information, an object image, and the retouching specification information, from one of multiple printing apparatuses. The information management device transmits the order information, which includes the object image, the image identification information, and the retouching specification information included in the stored retouching request information, to an image retouching device connecting with the information management device via the communication line. The information management device receives and stores the delivery information, which includes a resulting image retouched in response to the order information, from the image retouching device, and transmits the resulting retouched image included in the delivery information to the printing apparatus that has transmitted the retouching request information. This arrangement automates the request and the order for retouching each object image and delivery of each resulting retouched image. The printing apparatus itself is thus not required to retouch images. The image retouching device collectively retouches a number of object images, which are to be printed by the multiple printing apparatuses. This ensures efficient and high-performance retouching on images. Here, the retouching specification information may specify one of wrinkle reduction, dust removal, and color correction.

The first information management device of the invention may include: an accounting information adjustment control module that reads out the retouching request information stored in the information storage module and adjusts accounting information, which includes a charge for retouching of the object image based on the retouching specification information included in the read-out retouching request information, maps the adjusted accounting information to the printing apparatus identification information included in the retouching request information, and stores the mapped information into the information storage module; and an accounting information transmission control module that controls the receiver transmitter module to transmit the accounting information, which is mapped to the printing apparatus identification information and is stored in the information storage module, to the printing apparatus identified by the printing apparatus identification information via the communication line. In this case, the accounting information adjustment control module may adjust the accounting information with an accounting unit price, which corresponds to the retouching specification represented by the retouching specification information, or may compile charges corresponding to the retouching request information for a preset time period with respect to each of the multiple printing apparatuses, so as to adjust the accounting information.

The first information management device of the invention may further Include: a payment information adjustment control module that reads out the retouching request information, which is mapped to the delivery information and is stored in the information storage module, adjusts payment information that includes an amount payable for retouching of the object image, based on the retouching specification information included in the read-out retouching request information, maps the adjusted payment information to the image retouching device, which is involved in the delivery information mapped to the retouching request information, and stores the mapped information into the information storage module; and a payment information transmission control module that controls the receiver transmitter module to transmit the payment information, which is mapped to the image retouching device and is stored in the information storage module, to the image retouching device involved in the payment information via the communication line. In this case, the payment information adjustment control module may adjust the payment information with a payment unit price, which corresponds to the retouching specification represented by the retouching specification information, or may compile amounts payable corresponding to the delivery information for a preset time period with respect to each image retouching device, so as to adjust the payment information.

The first information management device of the invention may still further include: an expendable consumption information input control module that controls the receiver transmitter module to input expendable consumption information from each of the multiple printing apparatuses via the communication line and stores the input expendable consumption information into the information storage module, where the expendable consumption information includes the printing apparatus identification information for identifying the printing apparatus and consumption information regarding a consumption of an expendable by the printing apparatus; and an expendable consumption information transmission control module that controls the receiver transmitter module to transmit the expendable consumption information stored in the information storage module to an expendable supply management device that manages a supply of the expendable to the printing apparatus, which are identified by the printing apparatus identification information included in the expendable consumption information.

A second information management device of the present invention is a device that manages multiple printing apparatuses connecting with the information management device via a communication line, the information management device including: a retouching request reception module that receives a retouching request for an object image from each of the multiple printing apparatuses; a retouching request transmission module that transmits the received retouching request to an image retouching device, which connects with the information management device via the communication line; a retouched image reception module that receives a resulting image retouched in response to the transmitted retouching request by the image retouching device; and a retouched image transmission module that transmits the received resulting retouched image to the printing apparatus that has output the retouching request.

The second information management device of the invention receives a retouching request for an object image from one of multiple printing apparatuses connecting with the information management device via the communication line, and transmits the received retouching request to an image retouching device connecting with the information management device via the communication line. The information management device receives a resulting image retouched in response to the transmitted retouching request by the image retouching device and transmits the received resulting retouched image to the printing apparatus that has output the retouching request. The printing apparatus itself is thus not required to retouch images. The image retouching device collectively retouches a number of object images, which are to be printed by the multiple printing apparatuses. This ensures efficient and high-performance retouching on images.

The second information management device of the invention may include a memory module that maps the retouching request and the resulting image retouched in response to the retouching request to information regarding each of the multiple printing apparatuses, and stores the mapped information. The second information management device of the invention may further include: an accounting information adjustment module that adjusts accounting information on the received retouching request with respect to each of the multiple printing apparatuses; and an accounting information transmission module that transmits the adjusted accounting information to the printing apparatus at a preset timing. The second information management device of the invention may still further include: a payment information adjustment module that adjusts payment information on the received resulting retouched image with respect to each image retouching device; and a payment information transmission module that transmits the adjusted payment information to the image retouching device at a preset timing.

A first information management method of the present invention is a method that uses a computer, which includes an information storage module for storing information therein and a receiver transmitter module for receiving and transmitting information via a communication line, to manage multiple printing apparatuses connected with the computer via the communication line, the information management method including the steps of: (a) controlling the receiver transmitter module to receive retouching request information from one of the multiple printing apparatuses and storing the received retouching request information into the information storage module, where the retouching request information includes printing apparatus identification information for identifying the printing apparatus, image identification information for identifying an object image to be retouched, the object image identified by the image identification information, and retouching specification information regarding a specification of retouching to be performed on the object image; (b) controlling the receiver transmitter module to transmit order information to an image retouching device connecting with the information management device via the communication line, where the order information includes at least the object image, the image identification information, and the retouching specification information among the retouching request information stored in the information storage module; (c) controlling the receiver transmitter module to receive delivery information, which includes a resulting image retouched in response to the transmitted order information, and the image identification information included in the order information, from the image retouching device, mapping the received delivery information to the retouching request information, which includes the image identification information of the delivery information, and storing the mapped information into the information storage module; and (d) controlling the receiver transmitter module to transmit at least the resulting retouched image, which is included in the delivery information stored in the information storage module, to the printing apparatus identified by the printing apparatus identification information, which is included in the retouching request information mapped to the delivery information.

The first information management method of the invention receives and stores the retouching request information, which includes the printing apparatus identification information, the image identification information, an object image, and the retouching specification information, from one of multiple printing apparatuses. The information management method transmits the order information, which includes the object image, the image identification information, and the retouching specification information included in the stored retouching request information, to an image retouching device connecting with the information management device via the communication line. The information management method receives and stores the delivery information, which includes a resulting image retouched in response to the order information, from the image retouching device, and transmits the resulting retouched image included in the delivery information to the printing apparatus that has transmitted the retouching request information. This arrangement automates the request and the order for retouching each object image and delivery of each resulting retouched image. The printing apparatus itself is thus not required to retouch images. The image retouching device collectively retouches a number of object images, which are to be printed by the multiple printing apparatuses. This ensures efficient and high-performance retouching on images.

The first information management method of the invention may further include the steps of: (e) reading out the retouching request information stored in the information storage module and adjusting accounting information, which includes a charge for retouching of the object image based on the retouching specification information included in the read-out retouching request information, mapping the adjusted accounting information to the printing apparatus identification information included in the retouching request information, and storing the mapped information into the information storage module; and (f) controlling the receiver transmitter module to transmit the accounting information, which is mapped to the printing apparatus identification information and is stored in the information storage module, to the printing apparatus identified by the printing apparatus identification information via the communication line. The first information management method of the invention may still further include the steps of: (g) reading out the retouching request information, which is mapped to the delivery information and is stored in the information storage module, adjusting payment information that includes an amount payable for retouching of the object image, based on the retouching specification information included in the read-out retouching request information, mapping the adjusted payment information to the image retouching device, which is involved in the delivery information mapped to the retouching request information, and storing the mapped information into the information storage module; and (h) controlling the receiver transmitter module to transmit the payment information, which is mapped to the image retouching device and is stored in the information storage module, to the image retouching device involved in the payment information via the communication line.

A second information management method of the present invention is a method that manages multiple printing apparatuses via a communication line, the information management method including the steps of: (a) receiving a retouching request for an object image from each of the multiple printing apparatuses; (b) transmitting the received retouching request to an image retouching device, which connects with the information management device via the communication line; (c) receiving a resulting image retouched in response to the transmitted retouching request by the image retouching device; and (d) transmitting the received resulting retouched image to the printing apparatus that has output the retouching request.

The second information management method of the invention receives a retouching request for an object image from one of multiple printing apparatuses connecting with the information management device via the communication line, and transmits the received retouching request to an image retouching device connecting with the information management device via the communication line. The information management method receives a resulting image retouched in response to the transmitted retouching request by the image retouching device and transmits the received resulting retouched image to the printing apparatus that has output the retouching request. The printing apparatus itself is thus not required to retouch images. The image retouching device collectively retouches a number of object images, which are to be printed by the multiple printing apparatuses. This ensures efficient and high-performance retouching on images.

The second information management method may further include the steps of: (e) adjusting accounting information on the received retouching request with respect to each of the multiple printing apparatuses; and (f) transmitting the adjusted accounting information to the printing apparatus at a preset timing. The second information management method may still further include the steps of: (g) adjusting payment information on the received resulting retouched image with respect to each image retouching device; and (h) transmitting the adjusted payment information to the image retouching device at a preset timing.

BRIEF DESCRIPTION OF THE DRAWINGS

FIG. 6 shows one example of the retouching information;

FIG. 15 shows one example of the expendable consumption data.

DESCRIPTION OF THE PREFERRED EMBODIMENTS

Figure 1:
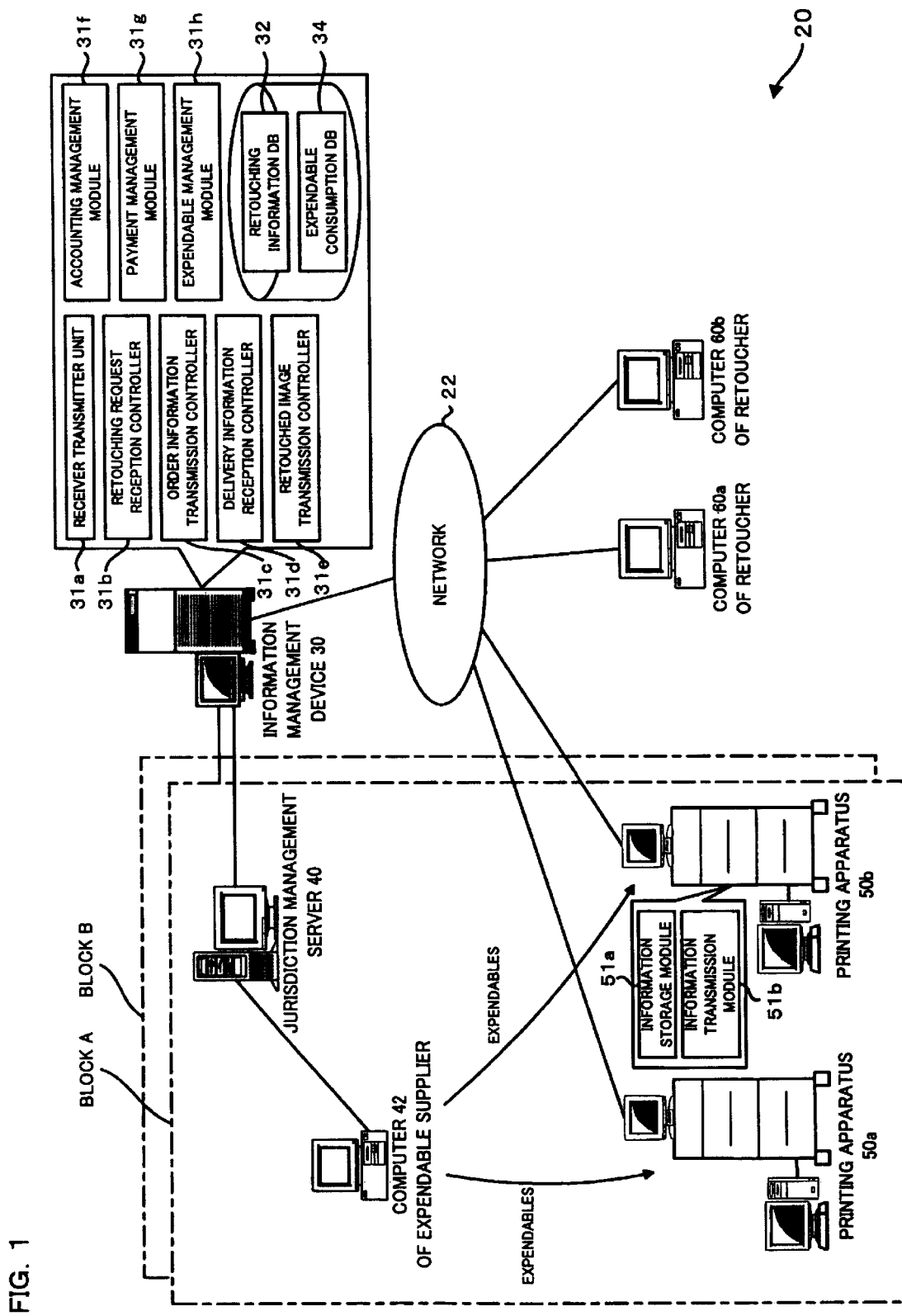
FIG. 1 schematically illustrates the construction of a printing management system 20 including an information management device 30 in one embodiment of the invention.

A preferred embodiment of the present invention is discussed below. FIG. 1 schematically illustrates the construction of a printing management system 20 including an information management device 30 in one embodiment of the invention. As illustrated, the information management device 30 of the embodiment includes a receiver transmitter unit 31a that receives and transmits information via a network 22, a retouching request reception controller 31b that controls the receiver transmitter unit 31a to receive a retouching request from any of multiple printing apparatuses 50a and 50b connecting with the network 22 and registers the received retouching request as retouching information into a retouching information database 32, and an order information transmission controller 31c that controls the receiver transmitter unit 31a to transmit order information, which includes an object image to be retouched and a specification of retouching, to a computer 60a or 60b of a selected retoucher connecting with the network 22, based on the retouching information. The information management device 30 further includes a delivery information reception controller 31d that controls the receiver transmitter unit 31a to receive delivery information, which includes a resulting image retouched in response to the order information, from the computer 60a or 60b of the selected retoucher and registers the received delivery information into the retouching information database 32, and a retouched image transmission controller 31e that controls the receiver transmitter unit 31a to transmit the resulting retouched image to the printing apparatus that has output the retouching request. The information management device 30 also includes an accounting management module 31f that manages accounting for retouching requests with respect to each of the printing apparatuses, a payment management module 31g that manages payment for retouching of images with respect to each of the retouchers, and an expendable management module 31h that receives data regarding consumption of expendables (hereafter referred to as expendable consumption data) from the multiple printing apparatuses 50a and 50b at regular intervals, registers the received expendable consumption data into an expendable consumption database 34, and transfers the registered expendable consumption data to a jurisdiction management server 40 that manages supplies of expendables to the multiple printing apparatuses 50a and 50b.

The jurisdiction management server 40 is installed in each of geographical blocks (for example, a block A and a block B in the illustrated example) and functions to manage supplies of expendables to the printing apparatuses 50a and 50b, which are located at photo studios in the block. The jurisdiction management server 40 gives a supply instruction to a computer 42 of an expendable supplier, which supplies expendables, such as printing papers and printing inks, to keep predetermined stocks at each photo studio, based on the expendable consumption data transferred from the information management device 30. The series of processing executed by the Jurisdiction management server 40 is not the essential part of the present invention and is thus not described in detail.

Each of the printing apparatuses 50a and 50b includes multiple ink Jet printers that are capable of high-performance photographic printing, and settles a schedule to specify a printer used for each print job transmitted from a computer connected via a LAN. Each of the printing apparatuses 50a and 50b includes an information storage module 51a that stores a printing apparatus ID utilized for identification of the printing apparatus, a jurisdiction management server ID utilized for identification of the jurisdiction management server having jurisdiction over the printing apparatus, and the expendable consumption data including a consumption of each expendable consumed for printing. The printing apparatus 50a or 50b also has an information transmission module 51b that transmits the expendable consumption data, together with the printing apparatus ID and the jurisdiction management server ID, to the information management device 30 at preset time intervals (for example, at every 24 hours), in response to a request from the information management device 30 or in response to a request from the printing apparatus 50a or 50b.

Figure 2:
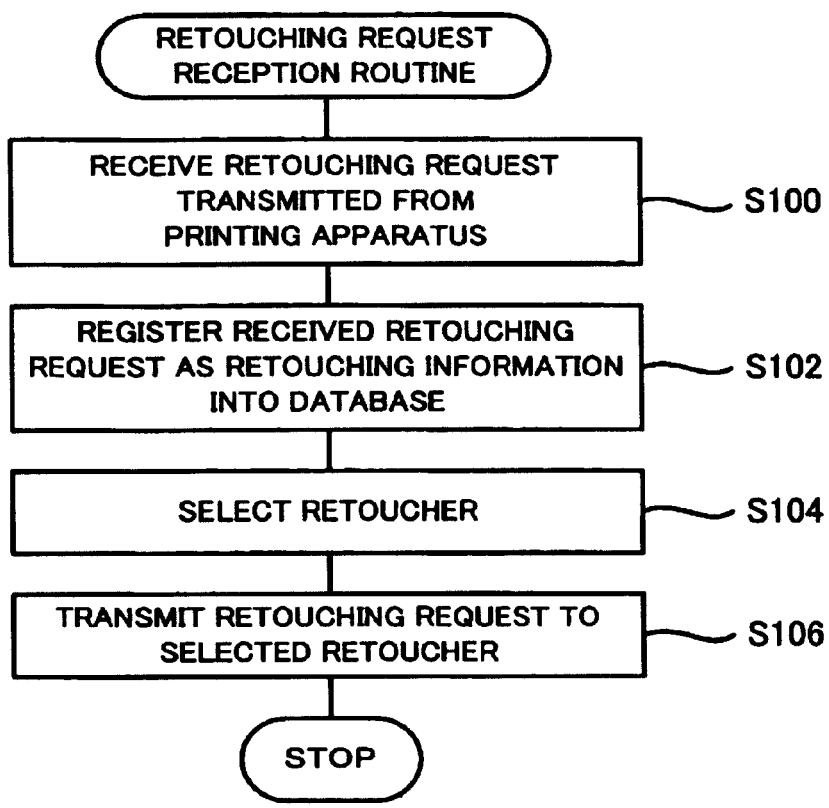
FIG. 2 is a flowchart showing a retouching request reception routine executed by the information management device 30 of the embodiment.
Figure 3:
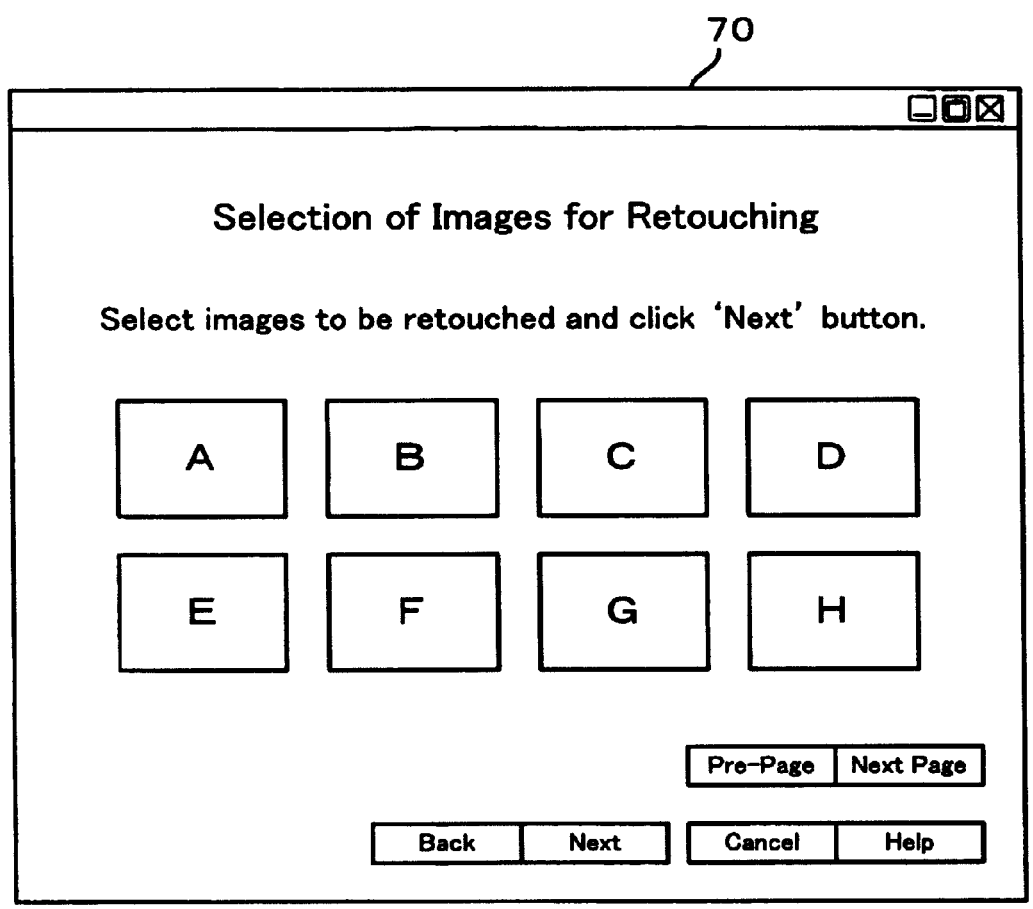
FIG. 3 shows one example of object image selection window 70 displayed on each printing apparatus 50a or 50b to allow the printing apparatus 50a or 50b to select desired object images for retouching.
Figure 4:
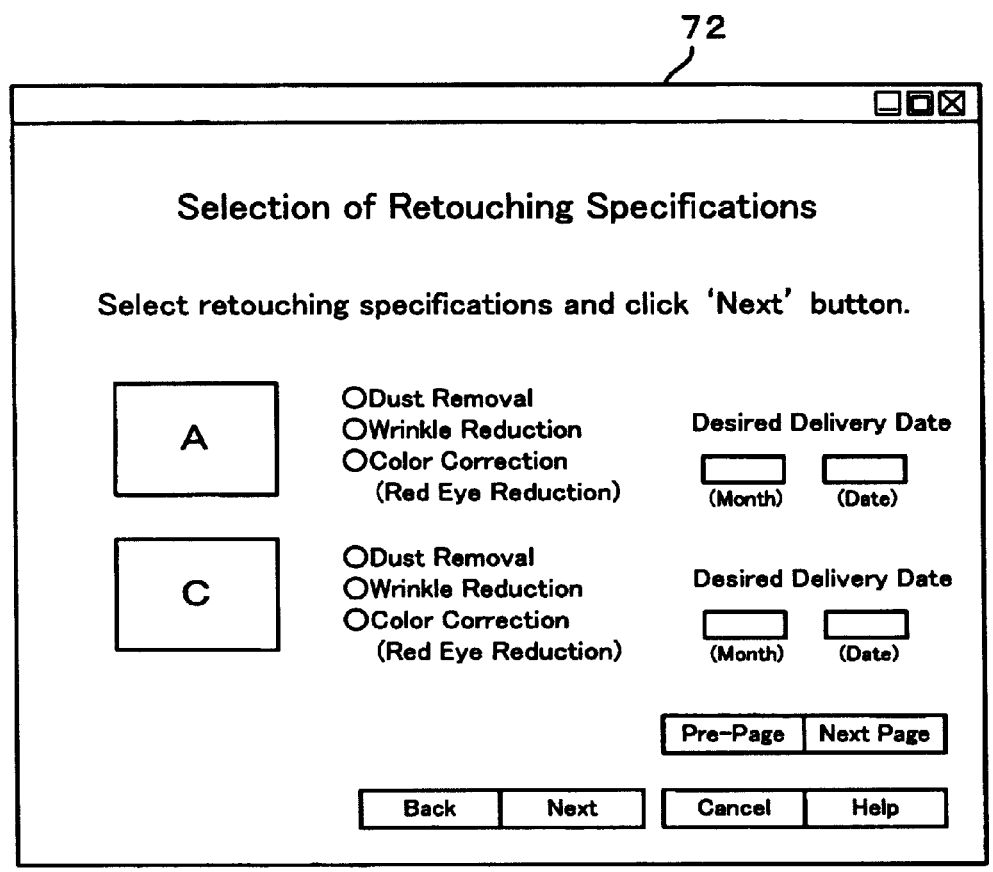
FIG. 4 shows one example of retouching specification selection window 72 displayed on each printing apparatus. 50a or 50b to allow the printing apparatus 50a or 50b to select desired retouching specifications.
Figure 5:
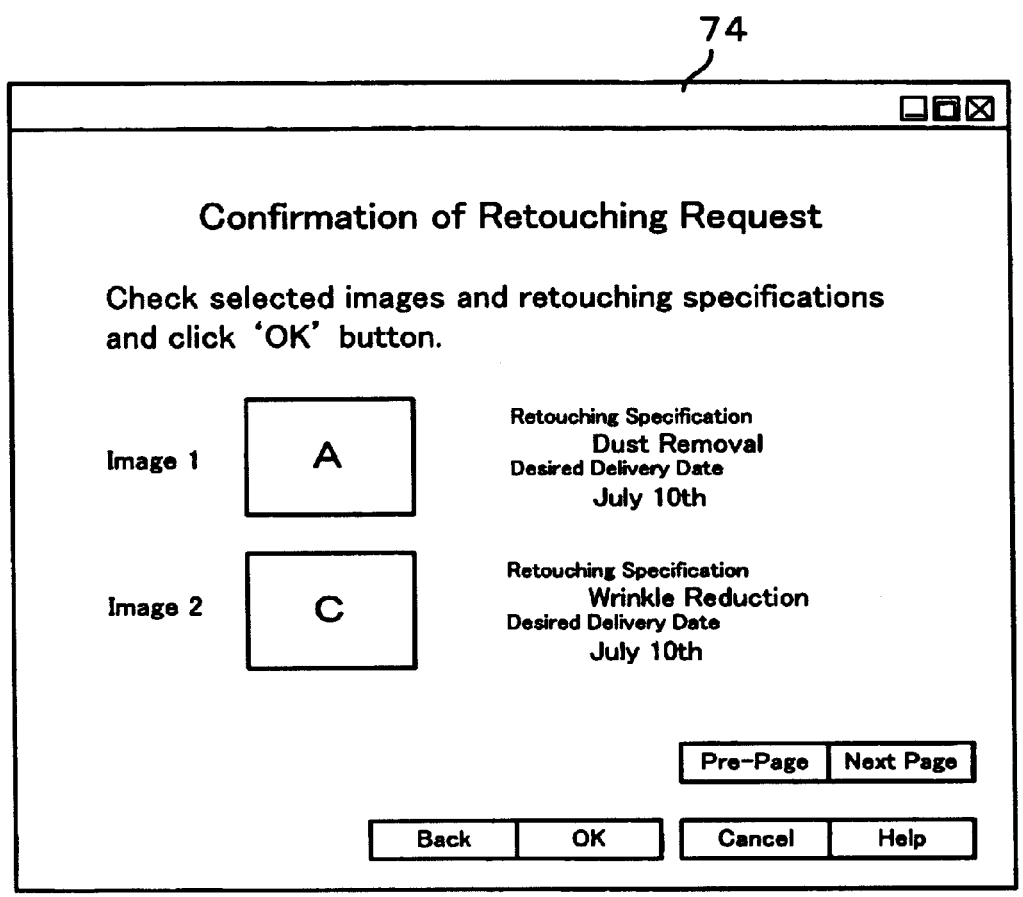
FIG. 5 shows one example of retouching request confirmation window 74 displayed on each printing apparatus 50a or 50b to allow the printing apparatus 50a or 50b to confirm the selected object images for retouching and the selected retouching specifications, prior to transmission to the information management device 30.

FIG. 2 is a flowchart showing a retouching request reception routine executed by the retouching request reception controller 31b and the order information transmission controller 31c included in the information management device 30 of the embodiment. This retouching request reception routine is activated, in response to a predetermined request from any of the multiple printing apparatuses 50a and 50b, for example, in response to an access to a retouching request window, which is to be transmitted from the information management device 30 to the printing apparatus 50a or 50b. When the program enters the retouching request reception routine, the information management device 30 of the embodiment first controls the receiver transmitter unit 31a to receive a retouching request transmitted from one of the printing apparatuses 50a and 50b (step S100). A concrete procedure of receiving the retouching request receives object images to be retouched and retouching specifications, which are selected and transmitted by one of the printing apparatuses 50a and 50b. FIG. 3 shows one example of object image selection window 70 displayed on each printing apparatus 50a or 50b to allow the printing apparatus 50a or 50b to select desired object images for retouching. FIG. 4 shows one example of retouching specification selection window 72 displayed on each printing apparatus 50a or 50b to allow the printing apparatus 50a or 50b to select desired retouching specifications. FIG. 5 shows one example of retouching request confirmation window 74 displayed on each printing apparatus 50a or 50b to allow the printing apparatus 50a or 50b to confirm the selected object images for retouching and the selected retouching specifications, prior to transmission to the information management device 30.

The object image selection window 70 of FIG. 3 displays enumeration of thumbnail images read by and stored in the printing apparatus 50a or 50b. Selection of desired object images to be retouched are specified by reversing display, for example, through a user's mouse operation, and are validated in response to a click of a 'Next' button. The user then selects a desired retouching specification among available options and inputs a desired delivery date with respect to each selected object image in the retouching specification selection window 72 shown in FIG. 4. The options include 'Dust Removal' for removing spots over the whole image, 'Wrinkle Reduction' for reducing wrinkles of the skin in each portrait, and 'Color Correction (Red Eye Reduction)' for reducing red eyes in each portrait and correcting the tone of the whole image. The selected retouching specifications are validated in response to a click of a 'Next' button. The selected object images and the selected retouching specifications are transmitted as a retouching request from the printing apparatus 50a or 50b to the information management device 30, in response to a click of an 'OK' button in the retouching request confirmation window 74 of FIG. 5, which displays enumeration of the selected object images and the selected retouching specifications. The illustrated example of the retouching specification selection window 72 of FIG. 4 and the retouching request confirmation window 74 of FIG. 5 is on the assumption that images A and C have been selected in the object image selection window 70 of FIG. 3. The object image selection window 70 of FIG. 3, the retouching specification selection window 72 of FIG. 4, and the retouching request confirmation window 74 of FIG. 5 are only illustrative to describe the process of selecting and transmitting desired object images to be retouched and desired retouching specifications. Any other adequate windows and techniques may thus be applied for selection and transmission of desired object images to be retouched and desired retouching specifications.

The information management device 30 receives the transmitted retouching request and registers the received retouching request as new retouching information into the retouching information database 32 (step S102). FIG. 6 shows one example of the retouching information registered in the retouching information database 32. In the example of FIG. 6, the retouching information includes a printing apparatus ID allocated to the printing apparatus that has transmitted a retouching request, a jurisdiction management server ID allocated to the jurisdiction management server that has jurisdiction over the printing apparatus, an image ID allocated to an object image to be retouched, a reception date when the retouching request has been received, retouching specifications, a desired delivery date, a retoucher ID allocated to a selected retoucher that has received the retouching request for the object image, a retouched image ID allocated to a retouched image received from the selected retoucher, a retouched image reception date when the retouched image has been received, a delivery date when the retouched image has actually been delivered to the printing apparatus, which had output the retouching request, a charge for the retouching request, and an amount payable for retouching to the selected retoucher. The processing of step S102 registers only the entries, which are specified at the time of receiving the retouching request from the printing apparatus 50a or 50b, among the above items; that is, the printing apparatus ID, the jurisdiction management server ID, the image ID, the reception date, the retouching specifications, and the desired delivery date in this example. The illustrated example of FIG. 6 shows registration of the entries with regard to the object image A selected and transmitted through the user's operations in the windows of FIGS. 3 through 5.

After registration of the retouching information into the retouching information database 32, the information management device 30 selects a retoucher, which the retouching request is transmitted to (step S104). Any of diverse techniques may be applied for selection of the retoucher. For example, the information management device 30 selects one among preset retouchers with respect to each of the printing apparatuses 50a and 50b, in response to the retouching request. In another example, the information management device 30 adequately selects a retoucher according to the volume of received retouching request. In still another example, the information management device 30 selects a retoucher, which has been specified by each printing apparatus 50a or 50b. Selection of the retoucher is, however, not the essential part of the present invention and is thus not described in detail.

Figure 7:
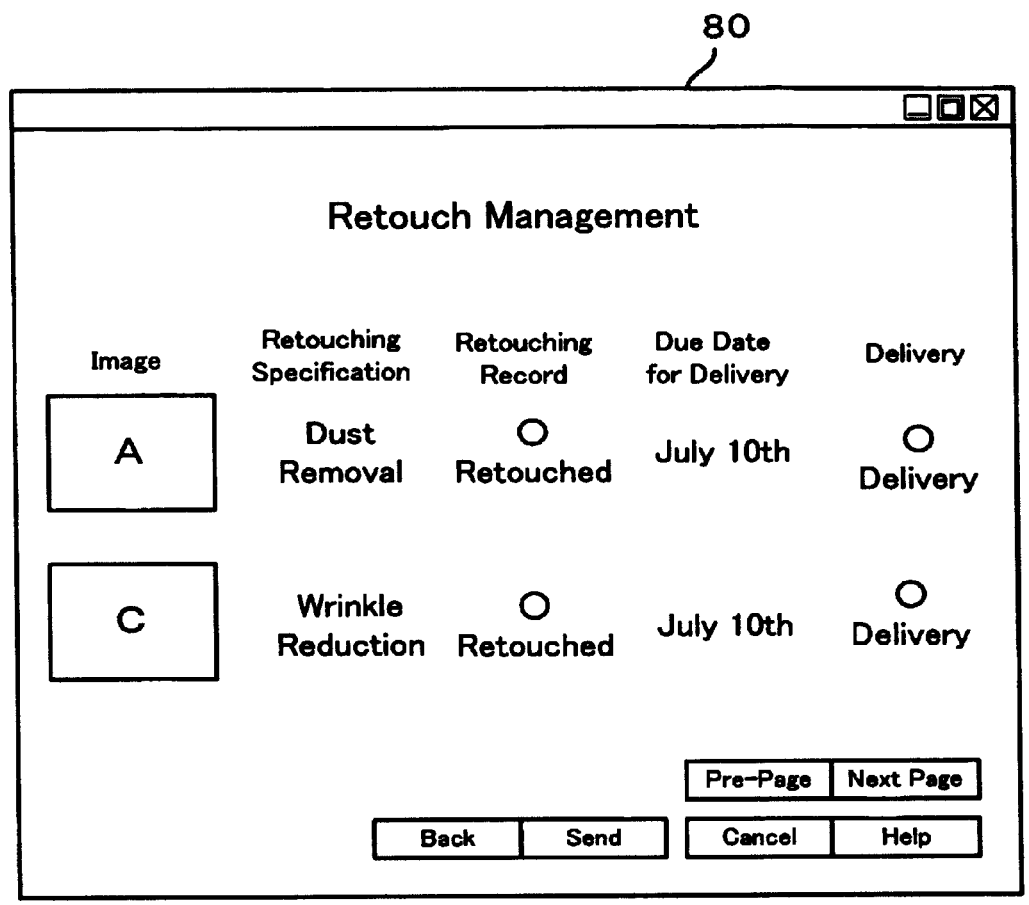
FIG. 7 shows one example of retouch management window 80 displayed on a computer 60a or 60b of each retoucher that has received a retouching request.

After selection of the retoucher, the information management device 30 controls the receiver transmitter unit 31a to transmit the retouching request to the computer of the selected retoucher (step S106). The program then exits from this retouching request reception routine. FIG. 7 shows one example of retouch management window 80 displayed on the computer of the selected retoucher to manage the retouching request. The illustrated example of FIG. 7 displays enumeration of thumbnails of object images to be retouched, retouching specifications selected for the respective object images, retouching records, due dates of delivery, and selection of delivery. The retouching records and the selection of delivery may be input by ticking radio buttons. The retouch management window 80 displays the details of the retouching request received by the computer 60a or 60b of the selected retoucher and receives an entry of the retouching record when each object image has been retouched in response to the retouching request. A delivery process from the selected retoucher to the information management device is also validated on the retouch management window 80. The delivery process will be discussed below as a retouched image delivery process. Selection of the thumbnail corresponding to each object image displayed on the retouch management window 80 activates retouching software (not shown) installed in the computer 60a or 60b of the selected retoucher to display the selected image and perform retouching on the selected image. A thumbnail of each retouched image is created and displayed on the retouch management window 80. The process of retouching each object image or the retouching software is not the essential part of the present invention and is thus not described in detail.

Figure 8:
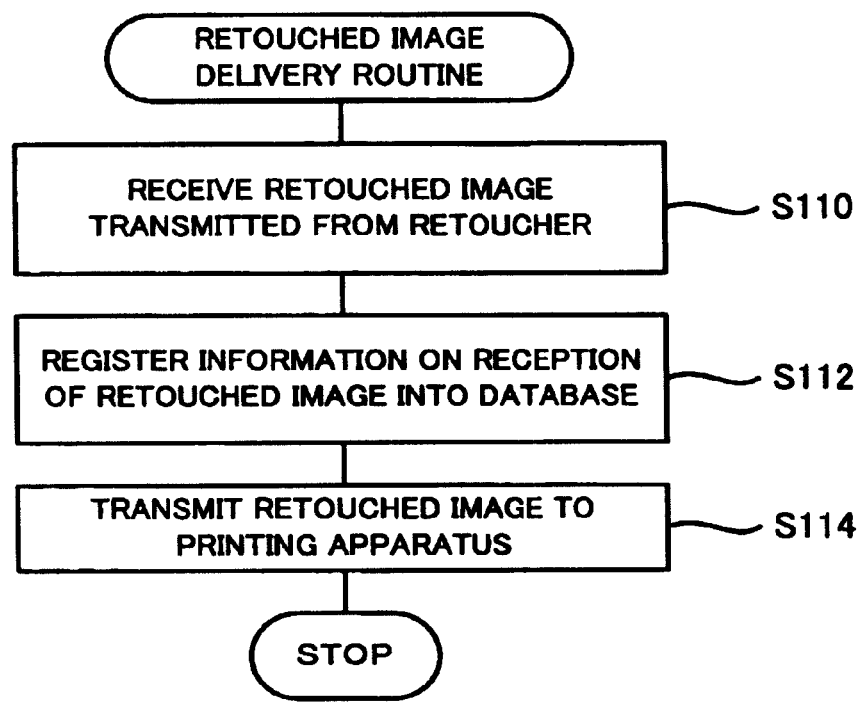
FIG. 8 is a flowchart showing a retouched image delivery routine executed by the information management device 30 of the embodiment.

The following describes a delivery process of each image retouched in response to the retouching request (retouched image). FIG. 8 is a flowchart showing a retouched image delivery routine executed by the delivery information reception controller 31d and the retouched image transmission controller 31e included in the information management device 30 of the embodiment. The retouched image delivery routine is activated in response to an access for delivery of the retouched image from the computer 60a or 60b of the selected retoucher. Each retouched image is delivered from the computer 60a or 60b of the selected retoucher, in response to selection of a radio button 'Delivery' corresponding to the retouched image to be delivered and a subsequent click of a 'Send' button on the retouch management window 80 shown in FIG. 8. When the program enters the retouched image delivery routine, the information management device 30 of the embodiment first controls the receiver transmitter unit 31a to receive each retouched image transmitted from the computer 60a or 60b of the selected retoucher (step S110), and registers information regarding reception of the retouched image as part of the retouching information into the retouching information database 32 (step S112). The information registered here includes the retouched image ID and the retouched image reception date in the illustrated example of FIG. 6. The retoucher ID has been registered as part of the retouching information, in response to selection of the retoucher at step S104 in the retouching request reception routine of FIG. 2.

Figure 9:
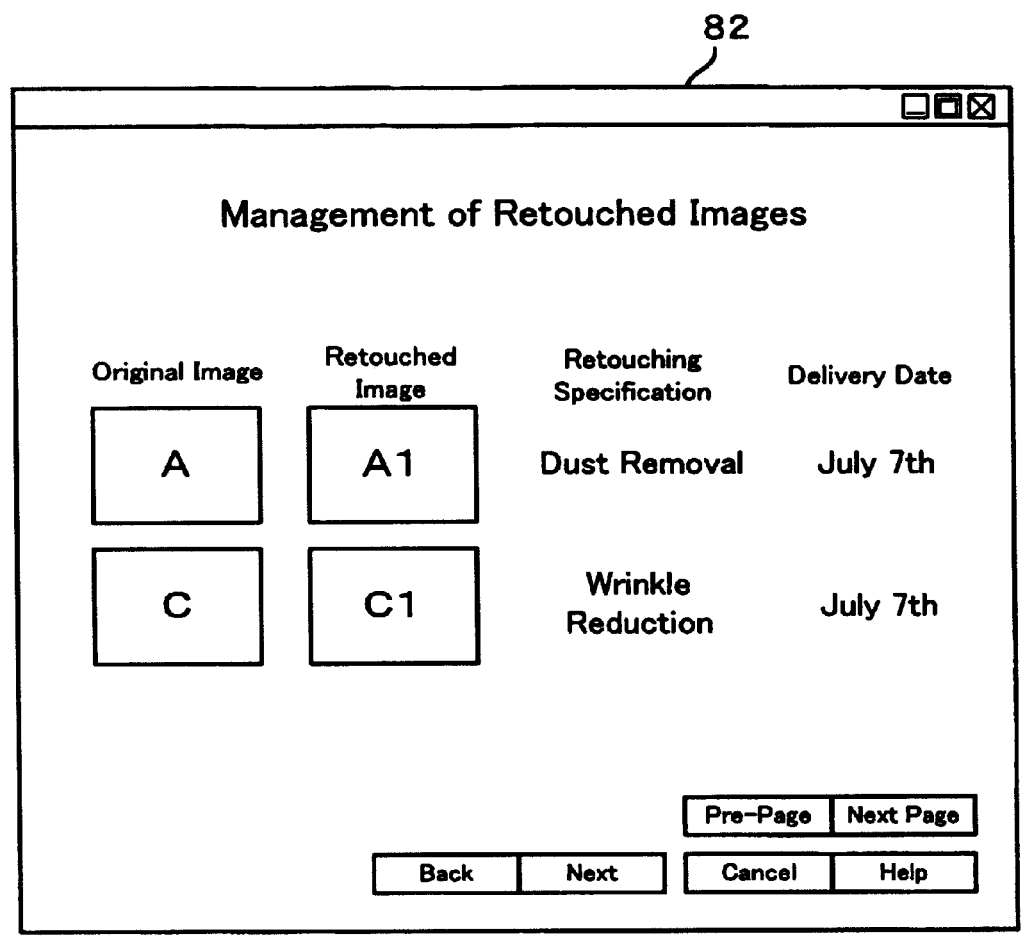
FIG. 9 shows one example of retouched image management window 82 displayed on each printing apparatus 50a or 50b that has received the delivery of retouched images.

The information management device 30 then controls the receiver transmitter unit 31a to transmit the retouched image to the printing apparatus that has output the retouching request (step S114). The program then exits from this retouched image delivery routine. The printing apparatus receives the respective retouched images thus transmitted and opens a retouched image management window 82 shown in FIG. 9 for confirmation of reception of the retouched images. The retouched image management window 82 displays thumbnails of original images involved in the retouching request and thumbnails of resulting retouched images, together with their retouching specifications and delivery dates. The user can thus check the results of the retouching. The delivery date is registered into the retouching information database 32 in the process of delivery of each retouched image to the printing apparatus.

Figure 10:
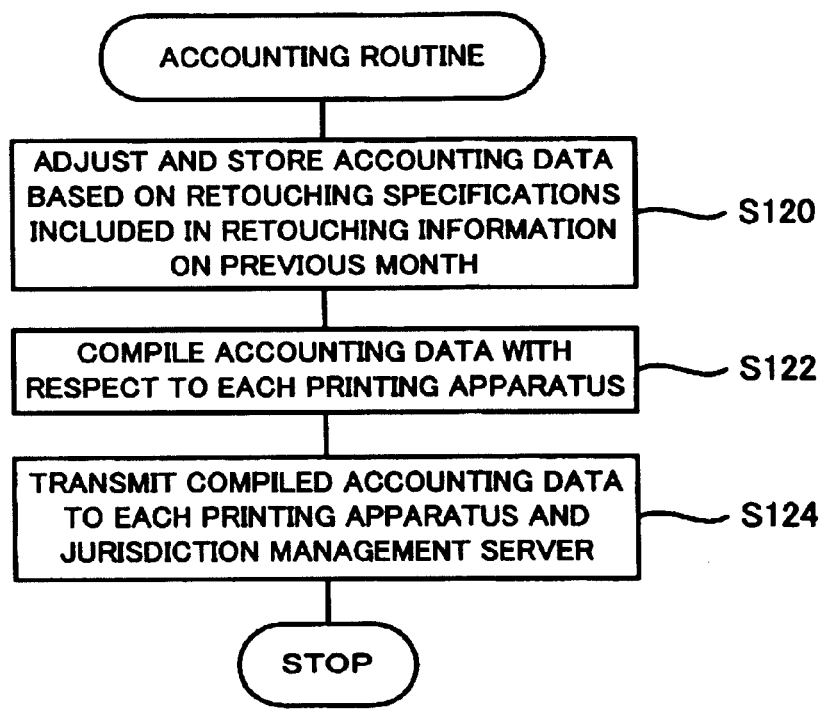
FIG. 10 is a flowchart showing an accounting routine to calculate a charge to each of the printing apparatuses 50a and 50b, which is executed by the information management device 30 of the embodiment.
Figure 11:
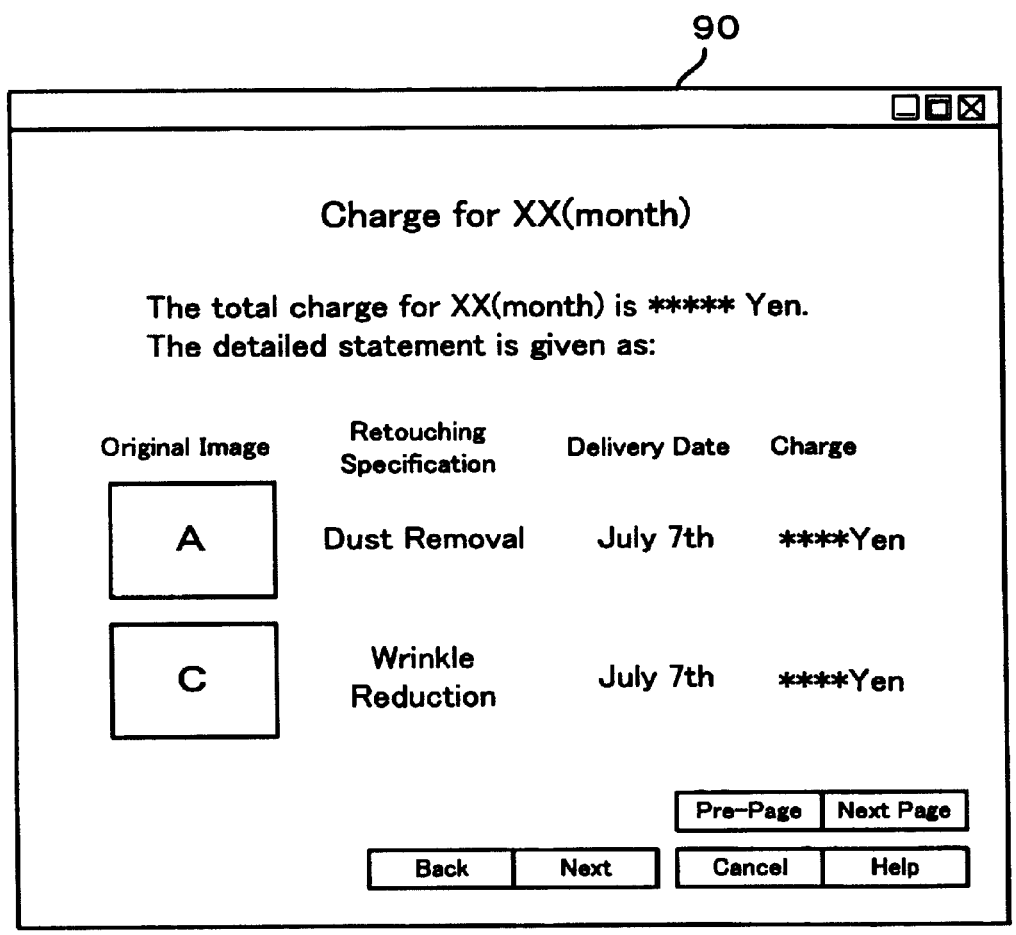
FIG. 11 shows one example of accounting display window 90 displayed on the printing apparatus 50a or 50b.

The discussion then regards an accounting process with respect to retouching requests for object images from the printing apparatus 50a or 50b. FIG. 10 is a flowchart showing an accounting routine to calculate a charge to each of the printing apparatuses 50a and 50b, which is executed by the accounting management module 31f included in the information management device 30 of the embodiment. The accounting routine is carried out on preset dates and times (for example, 2 am on the 1$^{st}$ day of every month). When the program enters the accounting routine, the information management device 30 of the embodiment first calculates a charge for the retouching specifications, which are included in each piece of the retouching information having the delivery date in a previous month, to the printing apparatus identified by the retouching information and registers the calculated charge into the retouching information database 32 (step S120). The procedure of this embodiment specifies the product of a unit price per unit size of the image and the total size of each object image as a charge for the retouching specification 'Dust Removal'. The procedure specifies a unit price per image as a charge for the retouching specification 'Wrinkle Reduction' or 'Color Correction (Red Eye Reduction)'. The procedure then sums up the calculated charges as a total charge for the retouching specifications. The information management device 30 compiles the calculated charges with respect to each of the printing apparatuses as accounting information (step S122), and controls the receiver transmitter unit 31a to transmit the accounting information to the printing apparatus and the jurisdiction management server 40 that has jurisdiction over the printing apparatus (step S124). The program then exits from this accounting routine. FIG. 11 shows one example of accounting display window 90 displayed on the printing apparatus 50a or 50b, which has received the accounting information.

Figure 12:
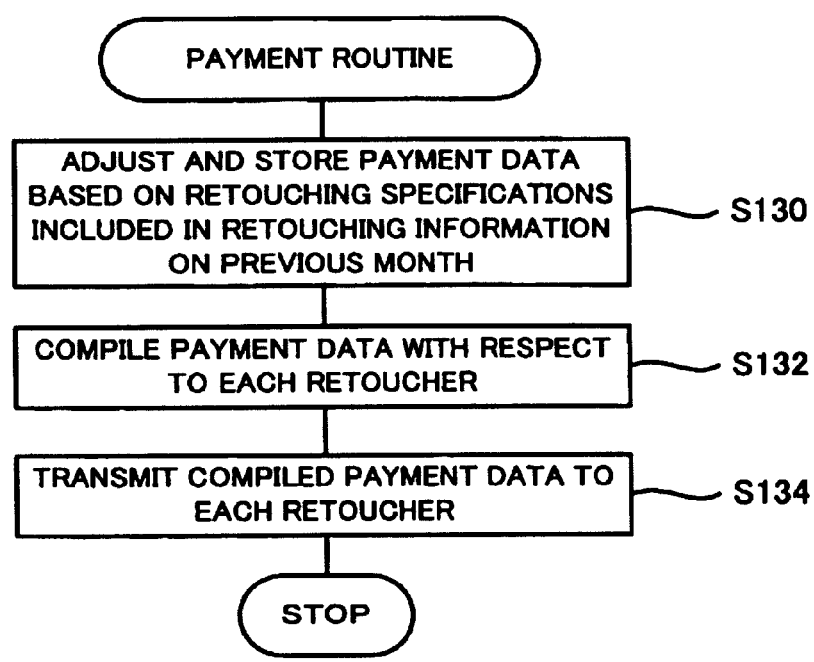
FIG. 12 is a flowchart showing a payment routine to calculate a payment to the selected retoucher, which is executed by the information management device 30 of the embodiment.
Figure 13:
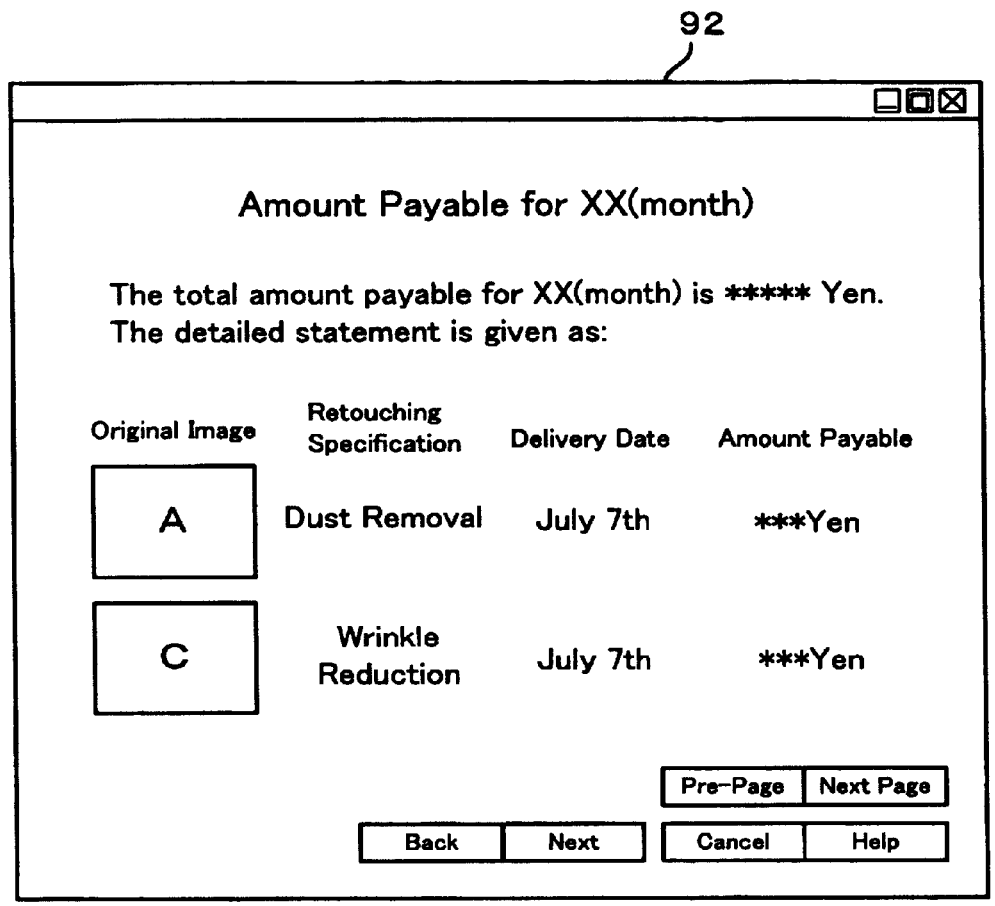
FIG. 13 shows one example of payment display window 92 displayed on the computer 60a or 60b of the selected retoucher.

The discussion subsequently regards a payment process with respect to retouching requests for object images by the selected retoucher. FIG. 12 is a flowchart showing a payment routine to calculate a payment to the selected retoucher, which is executed by the payment management module 31g included in the information management device 30 of the embodiment. The payment routine is carried out on preset dates and times (for example, 2 am on the 1$^{st}$ day of every month). When the program enters the payment routine, the information management device 30 of the embodiment first calculates an amount payable for the retouching specifications, which are included in each piece of the retouching information having the delivery date in a previous month, to the selected retoucher identified by the retouching information and registers the calculated amount payable into the retouching information database 32 (step S130). Like the calculation of the charge, the procedure of this embodiment specifies the product of a unit price per unit size of the image and the total size of each object image as an amount payable for the retouching specification 'Dust Removal'. The procedure specifies a unit price per image as an amount payable for the retouching specification 'Wrinkle Reduction' or 'Color Correction (Red Eye Reduction)'. The procedure then sums up the calculated amounts payable as a total amount payable for the retouching specifications. The information management device 30 compiles the calculated amounts payable with respect to each retoucher as payment information (step S132), and controls the receiver transmitter unit 31a to transmit the payment information to the computer 60a or 60b of the selected retoucher (step S134). The program then exits from this payment routine. FIG. 13 shows one example of payment display window 92 displayed on the computer 60a or 60b of the selected retoucher, which has received the payment information.

Figure 14:
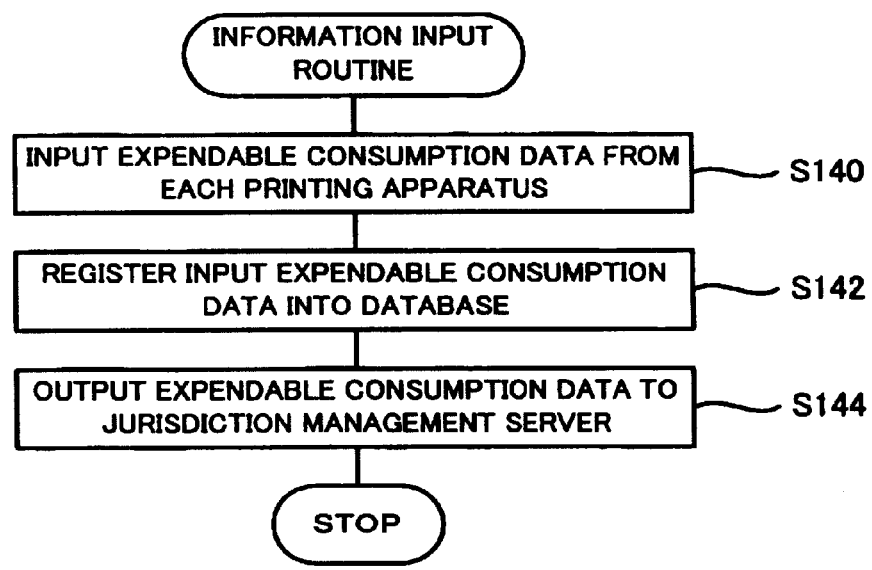
FIG. 14 is a flowchart showing an information input routine executed by the information management device 30 of the embodiment.

The following describes management of supplies of expendables to the printing apparatuses 50a and 50b in the printing management system 20. FIG. 14 is a flowchart showing an information input routine executed by the expendable management module 31h included in the information management device 30 of the embodiment. This information input routine is repeatedly executed at preset time intervals (for example, at every 24 hours). When the program enters the information input routine, the information management device 30 of the embodiment first controls the receiver transmitter unit 31a to input the expendable consumption data from each of the printing apparatuses 50a and 50b in all blocks connecting with the information management device 30 via the network 22 (step S140). FIG. 15 shows one example of the expendable consumption data. As shown in FIG. 15, the expendable consumption data of the embodiment includes the printing apparatus ID, the jurisdiction management server ID, a data acquisition date as the information input date from the printing apparatus, a printer ID allocated to each printer incorporated in the printing apparatus, a printing paper consumption with regard to each manufacturer, each paper size, and each paper type, and an ink consumption with regard to each manufacturer and each color. The printing apparatus 50a or 50b may read identification information (for example, identification information in the form of a barcode) attached to a marginal space of the printing paper in the process of printing an image and set the identification information as part of the expendable consumption data regarding the printing paper consumption. Information on the manufacturer, the paper size, and the paper type input by an operator into the printing apparatus 50a or 50b in the process of setting the printing paper in the printing apparatus 50a or 50b may be set as part of the expendable consumption data regarding the printing paper consumption. The printing apparatus 50a or 50b may read identification information of the manufacturer. (for example, manufacturer information stored in a storage element) stored in an ink cartridge in the process of printing an image and set the identification information, together with an estimated consumption of each color ink used for printing the image, as part of the expendable consumption data.

After reading the expendable consumption data, the information management device 30 registers the input expendable consumption data into the expendable consumption database 32 (step S142), and controls the receiver transmitter unit 31a to output the registered expendable consumption data to the jurisdiction management server 40 having an allocated ID identical with the input jurisdiction management server ID (step S144). The program then exits from this information input routine. The jurisdiction management server 40 obtains the expendable consumption data from the information management device 30 and manages supplies of expendables by the expendable supplier to the photo studios, at which the printing apparatuses are located, in the block under jurisdiction based on the obtained expendable consumption data.

As described above, the information management device 30 of the embodiment receives a retouching request for each object image from each of the printing apparatuses 50a and 50b connecting with the network 22 and transmits the received retouching request to the computer 60a or 60b of the selected retoucher. The information management device 30 also receives each resulting retouched image from the computer 60a or 60b of the selected retoucher and transmits the received resulting retouched image to the printing apparatus 50a or 50b that has transmitted the retouching request. This arrangement ensures efficient and high-performance retouching of object images to be printed by the multiple printing apparatuses 50a and 50b. The structure of the embodiment also enables the accounting process with regard to retouching requests for object images and the payment process for retouching of the object images to be implemented automatically and adequately at a high speed. The information management device 30 of the embodiment also ensures effective management of supplies of expendables consumed for printing by the multiple printing apparatuses 50a and 50b.

The retouching information database 32 and the expendable consumption database 34 included in the information management device 30 of the embodiment correspond to the information storage module of the invention. The receiver transmitter unit 31a corresponds to the receiver transmitter module of the invention. The retouching request reception controller 31b, the order information transmission controller 31c, the delivery information reception controller 31d, and the retouched image transmission controller 31e respectively correspond to the retouching request reception control module, the order information transmission control module, the delivery information reception control module, and the retouched image transmission control module of the present invention. The accounting management module 31f corresponds to the accounting information adjustment control module and the accounting information transmission control module of the invention. The payment management module 31g corresponds to the payment information adjustment control module and the payment information transmission control module of the invention. The expendable management module 31h corresponds to the expendable consumption information input control module and the expendable consumption information transmission control module of the invention.

The information management device 30 of the embodiment carries out the accounting process and the payment process with regard to retouching requests for object images and management of supplies of expendables consumed for printing, in addition to the processing involved in the retouching requests for object images. In one possible modification, the information management device 30 may not carry out the management of supplies of expendables or the accounting process and the payment process with regard to retouching requests for object images.

The information management device 30 of the embodiment carries out the accounting process and the payment process with regard to retouching requests for object images once a month. This is, however, not restrictive in any sense. The frequencies of the accounting process and the payment process may be varied according to the requirements, for example, once a week or once a day.

The information management device 30 of the embodiment adjusts the accounting data and the payment data by the accounting process or the payment process executed once a month. In one possible modification, the accounting data and the payment data may be adjusted by the retouching request reception process executed in response to reception of each retouching request or by the retouched image delivery process executed for delivery of each retouched image.

The information management device 30 of the embodiment selects the retoucher and transmits the retouching request to the computer of the selected retoucher, after registration of the retouching request into the retouching information database 32 in the retouching request reception process. One modified procedure may display enumeration of the registered retouching requests in response to a requirement from the computer 60a or 60b of the retoucher and transmit a retouching request selected out of the enumeration by the retoucher to the computer of the retoucher.

The above description regards the printing management device 30 for managing information on multiple printing apparatuses in one embodiment of the invention. The invention may also be actualized by a printing management method corresponding to the information management device 30 of the embodiment, as well as by a program that causes a computer to attain the functions of the information management device 30 of the embodiment and a program that causes the computer to execute the respective steps of the information management method. These programs may be obtained by programming the respective steps of the retouching request reception routine of FIG. 2, the retouched image delivery routine of FIG. 8, the accounting routine of FIG. 10, the payment routine of FIG. 12, and the information input routine of FIG. 14 in an adequate programming language.

The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. An information management device that manages multiple printing apparatuses connecting with said information management device via a communication line, said information management device comprising:

an information storage module that stores information therein;

a receiver transmitter module that receives and transmits information via the communication line;

a retouching request reception control module that controls said receiver transmitter module to receive retouching request information from one of the multiple printing apparatuses and stores the received retouching request information into said information storage module, where the retouching request information includes printing apparatus identification information for identifying the printing apparatus, image identification information for identifying an object image to be retouched, the object image identified by the image identification information, and retouching specification information regarding a specification of retouching to be performed on the object image;

an image retouching device selection module that selects an image retouching device for a received image retouching request from one of multiple image retouching devices connecting with said information management device via the communication line based on the retouching specification information and a condition of the image retouching devices;

an order information transmission control module that controls said receiver transmitter module to transmit order information to a selected image retouching device, where the order information includes at least the object image, the image identification information, and the retouching specification information among the retouching request information stored in said information storage module;

a delivery information reception control module that controls said receiver transmitter module to receive delivery information, which includes a resulting image retouched in response to the transmitted order information, and the image identification information included in the order information, from the image retouching device, maps the received delivery information to the retouching request information, which includes the image identification information of the delivery information, and stores the mapped information into said information storage module; and a retouched image transmission control module that controls said receiver transmitter module to transmit at least the resulting retouched image, which is included in the delivery information stored in said information storage module, to the printing apparatus identified by the printing apparatus identification information, which is included in the retouching request information mapped to the delivery information.

2. An information management device in accordance with claim 1, wherein the retouching specification information specifies one of wrinkle reduction, dust removal, and color connection.

3. An information management device in accordance with claim 1, said information management device further comprising:

an accounting information adjustment control module that reads out the retouching request information stored in said information storage module and adjusts accounting information, which includes a charge for retouching of the object image based on the retouching specification information included in the read-out retouching request information, maps the adjusted accounting information to the printing apparatus identification information included in the retouching request information, and stores the mapped information into said information storage module; and an accounting information transmission control module that controls said receiver transmitter module to transmit the accounting information, which is mapped to the printing apparatus identification information and is stored in said information storage module, to the printing apparatus identified by the printing apparatus identification information via the communication line.

4. An information management device in accordance with claim 3, wherein said accounting information adjustment control module adjusts the accounting information with an accounting unit price, which corresponds to the retouching specification represented by the retouching specification information.

5. An information management device in accordance with claim 3, wherein said accounting information adjustment control module compiles charges corresponding to the retouching request information for a preset time period with respect to each of the multiple printing apparatuses, so as to adjust the accounting information.

6. An information management device in accordance with claim 1, said information management device further comprising:

a payment information adjustment control module that reads out the retouching request information, which is mapped to the delivery information and is stored in said information storage module, adjusts payment information that includes an amount payable for retouching of the object image, based on the retouching specification information included in the read-out retouching request information, maps the adjusted payment information to the image retouching device, which is involved in the delivery information mapped to the retouching request information, and stores the mapped information into said information storage module; and a payment information transmission control module that controls said receiver transmitter module to transmit the payment information, which is mapped to the image retouching device and is stored in said information storage module, to the image retouching device involved in the payment information via the communication line.

7. An information management device in accordance with claim 6, wherein said payment information adjustment control module adjusts the payment information with a payment unit price, which corresponds to the retouching specification represented by the retouching specification information.

8. An information management device in accordance with claim 6, wherein said payment information adjustment control module compiles amounts payable corresponding to the delivery information for a preset time period with respect to each image retouching device, so as to adjust the payment information.

9. An information management device in accordance with claim 1, said information management device further comprising:

an expendable consumption information input control module that controls said receiver transmitter module to input expendable consumption information from each of the multiple printing apparatuses via the communication line and stores the input expendable consumption information into said information storage module, where the expendable consumption information includes the printing apparatus identification information for identifying the printing apparatus and consumption information regarding a consumption of an expendable by the printing apparatus; and an expendable consumption information transmission control module that controls said receiver transmitter module to transmit the expendable consumption information stored in said information storage module to an expendable supply management device that manages a supply of the expendable to the printing apparatus, which are identified by the printing apparatus identification information included in the expendable consumption information.

10. An information management method that uses a computer, which includes an information storage module for storing information therein and a receiver transmitter module for receiving and transmitting information via a communication line, to manage multiple printing apparatuses connected with said computer via the communication line, said information management method comprising the steps of:

(a) controlling said receiver transmitter module to receive retouching request information from one of the multiple printing apparatuses and storing the received retouching request information into said information storage module, where the retouching request information includes printing apparatus identification information for identifying the printing apparatus, image identification information for identifying an object image to be retouched, the object image identified by the image identification information, and retouching specification information regarding a specification of retouching to be performed on the object image;

(b) controlling said receiver transmitter module to transmit order information to an image retouching device that is selected as an image retouching device for a received image retouching request from one of multiple image retouching devices connecting with said computer via the communication line based on the retouching specification information and a condition of the image retouching devices, where the order information includes at least the object image, the image identification information, and the retouching specification information among the retouching request information stored in said information storage module;

(c) controlling said receiver transmitter module to receive delivery information, which includes a resulting image retouched in response to the transmitted order information, and the image identification information included in the order information, from the image retouching device, mapping the received delivery information to the retouching request information, which includes the image identification information of the delivery information, and storing the mapped information into said information storage module; and (d) controlling said receiver transmitter module to transmit at least the resulting retouched image, which is included in the delivery information stored in said information storage module, to the printing apparatus identified by the printing apparatus identification information, which is included in the retouching request information mapped to the delivery information.

11. An information management method in accordance with claim 10, said information management method further comprising the steps of:

(e) reading out the retouching request information stored in said information storage module and adjusting accounting information, which includes a charge for retouching of the object image based on the retouching specification information included in the read-out retouching request information, mapping the adjusted accounting information to the printing apparatus identification information included in the retouching request information, and storing the mapped information into said information storage module; and (f) controlling said receiver transmitter module to transmit the accounting information, which is mapped to the printing apparatus identification information and is stored in said information storage module, to the printing apparatus identified by the printing apparatus identification information via the communication line.

12. An information management method in accordance with claim 10, said information management method further comprising the steps of:

(g) reading out the retouching request information, which is mapped to the delivery information and is stored in said information storage module, adjusting payment information that includes an amount payable for retouching of the object image, based on the retouching specification information included in the read-out retouching request information, mapping the adjusted payment information to the image retouching device, which is involved in the delivery information mapped to the retouching request information, and storing the mapped information into said information storage module; and (h) controlling said receiver transmitter module to transmit the payment information, which is mapped to the image retouching device and is stored in said information storage module, to the image retouching device involved in the payment information via the communication line.

* * * * *